(12) United States Patent
Galjour

(10) Patent No.: US 11,378,117 B1
(45) Date of Patent: Jul. 5, 2022

(54) METHOD AND APPARATUS FOR ATTACHING LEGS TO FURNITURE

(71) Applicant: Benjamin Andrew Galjour, Tupelo, MS (US)

(72) Inventor: Benjamin Andrew Galjour, Tupelo, MS (US)

( * ) Notice: Subject to any disclaimer, the term of this patent is extended or adjusted under 35 U.S.C. 154(b) by 393 days.

(21) Appl. No.: 16/774,957

(22) Filed: Jan. 28, 2020

(51) Int. Cl.
| | |
|---|---|
| *F16B 12/44* | (2006.01) |
| *A47C 17/86* | (2006.01) |
| *A47C 4/02* | (2006.01) |
| *A47C 19/00* | (2006.01) |
| *F16M 11/16* | (2006.01) |

(52) U.S. Cl.
CPC ............... *F16B 12/44* (2013.01); *A47C 4/02* (2013.01); *A47C 17/86* (2013.01); *A47C 19/005* (2013.01); *F16M 11/16* (2013.01)

(58) Field of Classification Search
CPC ...... F16B 12/44; F16B 12/2009; F16B 12/50; F16B 12/48; F16B 12/54; A47C 4/02; A47C 17/86; A47C 19/005; A47B 13/021; A47B 2013/022; A47B 2013/024; F16M 11/16
USPC .................................................... 248/222.52
See application file for complete search history.

(56) References Cited

U.S. PATENT DOCUMENTS

| | | | | |
|---|---|---|---|---|
| 1,605,305 A | * | 11/1926 | Vinje ....................... | A47L 13/08 30/169 |
| 2,087,204 A | * | 7/1937 | Johnson .................. | B21D 53/48 29/505 |
| 2,905,422 A | | 9/1959 | Sacharow | |
| 2,973,233 A | * | 2/1961 | McPhee .................. | F16B 12/48 403/189 |
| 4,657,302 A | | 4/1987 | Snyder | |
| 5,232,303 A | * | 8/1993 | Rubner ................ | A47B 13/021 403/252 |
| 6,929,226 B1 | * | 8/2005 | Philistine ................ | F16B 21/02 248/222.12 |

(Continued)

*Primary Examiner* — Christopher Garft
(74) *Attorney, Agent, or Firm* — George L Williamson

(57) ABSTRACT

Method and apparatus for attaching legs to furniture using a mounting plate having a pair of studs on one side and a furniture leg on the other side. Three embodiments are shown wherein the mounting plate is a single piece in one embodiment, a double piece in a second embodiment, and a double piece without a leg in a third embodiment. The mounting plate mounts to the underside of the piece of furniture using screws extended through a plurality of mounting holes so that the studs are inserted into and fixed to the piece of furniture. The mounting plate has an S-shaped aperture in it for receiving a mating S-shaped portion which is attached to the leg using an insert portion so that the S-shape portion then passes through the plate to the upper side of the plate and is turned approximately 45 to 90 degrees so that the inner edges of the ends of the S-shaped portion frictionally engages the studs wherein the leg becomes attached to the piece of furniture. The two piece embodiment works similarly to the one piece embodiment except that the mounting plate is divided into two parts for placement on each side of the mating adjacent parts of the piece of furniture so that when the S-shaped portion is turned and frictionally engages the studs, it not only joins the leg to the underside of the piece of furniture but also joins the two adjacent pieces of furniture together.

15 Claims, 3 Drawing Sheets

(56) References Cited

U.S. PATENT DOCUMENTS

| | | |
|---|---|---|
| 6,932,428 B2 | 8/2005 | Murphy |
| 8,800,799 B1 * | 8/2014 | Hawker ............... B65D 43/163 |
| | | 109/51 |
| 2005/0146179 A1 | 7/2005 | Murphy |
| 2005/0253430 A1 | 11/2005 | George et al. |
| 2016/0270529 A1 | 9/2016 | Hollins |

* cited by examiner

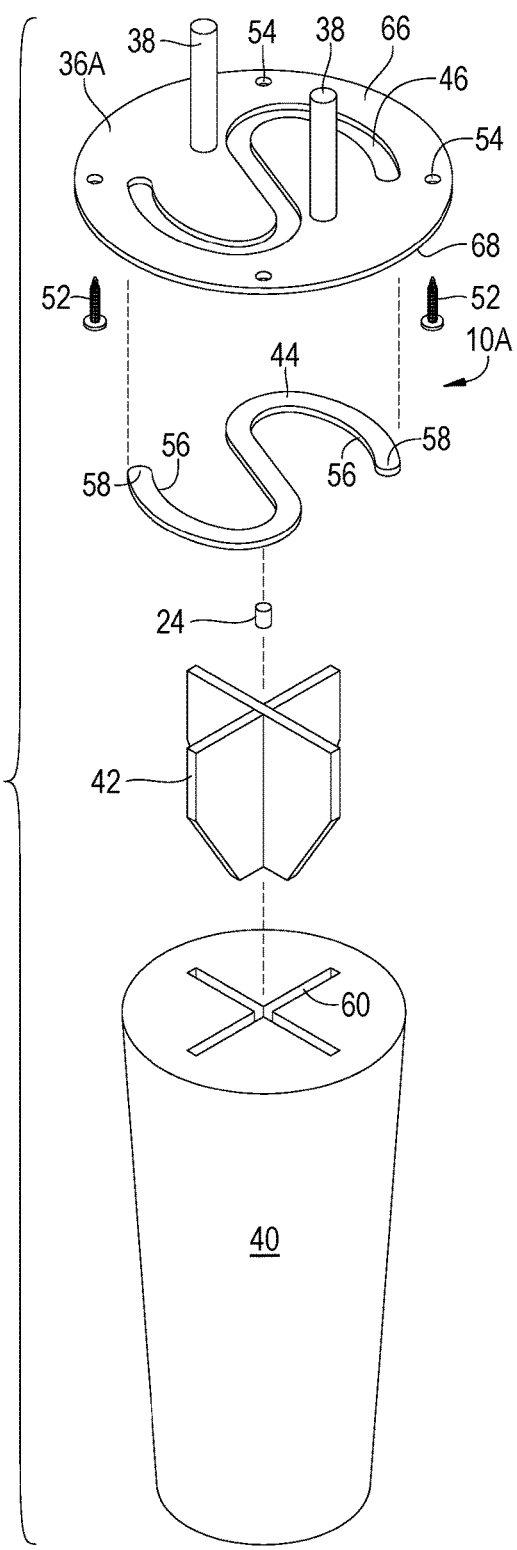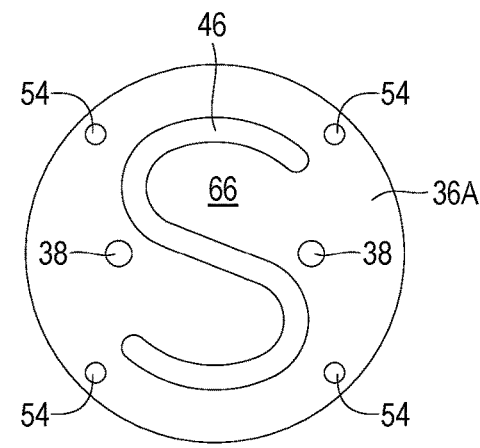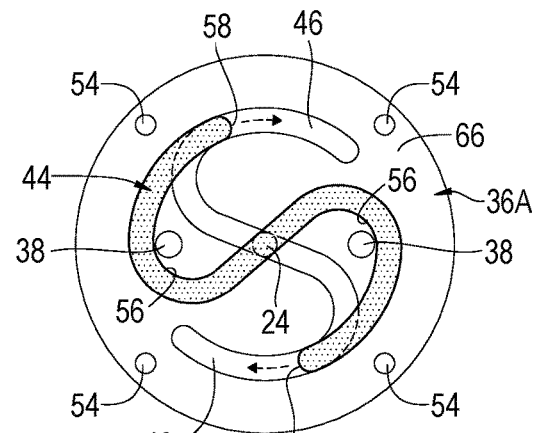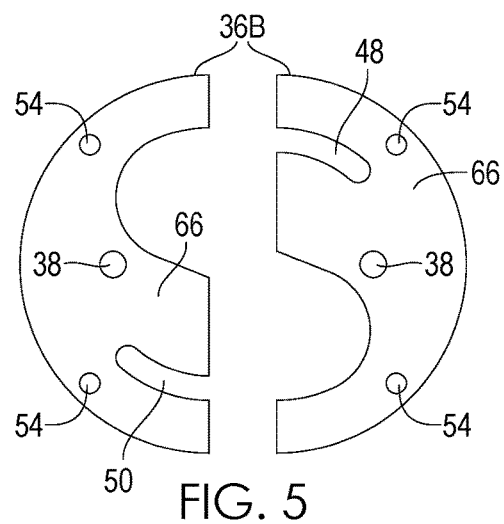

METHOD AND APPARATUS FOR ATTACHING LEGS TO FURNITURE

BACKGROUND OF THE INVENTION

Field of the Invention

The present invention relates generally to modular furniture, and more particularly, is concerned with the attachment of legs to the undersides of modular furniture so as to support the modular furniture in an upright position on a supporting surface. The present invention may also be used to join adjacent sections of modular furniture together.

Modular furniture systems which include sectional piece sofas, love seats, combination sofas, reclining chairs, and bedding units, etc., have multiple pieces or sections which are positioned abutting each other in the conventional manner. When the sectional pieces are butted together, a seam/joint is formed between the individual sections.

Description of the Related Art

Devices relevant to the present invention have been described in the related art; however, none of the related art devices disclose the unique features of the present invention.

In U.S. Patent Application Publication No. 2016/0270529 dated Sep. 22, 2016, Hollins disclosed furniture legs cinching device and method. In U.S. Patent Application Publication No. 2005/0146179 dated Jul. 7, 2005, Murphy disclosed a connector for adjacent seating units. In U.S. Patent Application Publication No. 2005/0253430 dated Nov. 17, 2005, George, et al., disclosed a modular seating system. In U.S. Patent Application Publication No. 2004/0095000 dated May 20, 2004, Durling disclosed an apparatus and method for assembling components of knock-down furniture. In U.S. Pat. No. 2,905,422 dated Sep. 22, 1959, Sacharow disclosed an attaching bracket for furniture legs and the like. In U.S. Pat. No. 4,657,302 dated Apr. 14, 1987, Snyder disclosed a lounge construction. In U.S. Pat. No. 6,932,428 dated Aug. 23, 2005, Murphy disclosed a connector for adjacent seating units.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a mounting plate having a pair of studs on one side and a furniture leg on the other side for attaching legs to a piece of furniture. The present invention has three embodiments wherein the mounting plate is a single piece in one embodiment, a double piece in a second embodiment, and a double piece without a leg in a third embodiment. The mounting plate mounts to the underside of the piece of furniture using screws extended through a plurality of mounting holes so that the studs are inserted into and fixed to the piece of furniture. The mounting plate has an S-shaped aperture in it for receiving a mating S-shaped portion which is attached to the leg using an insert portion so that the S-shape portion then passes through the plate to the upper side of the plate and is turned approximately 45 to 90 degrees so that the inner edges of the ends of the S-shaped portion frictionally engages the studs wherein the leg becomes attached to the piece of furniture.

The two piece embodiment of the present invention works similarly to the one piece embodiment except that the mounting plate is divided into two parts for placement on each side of the mating adjacent parts of the piece of furniture so that when the S-shaped portion is turned and frictionally engages the studs, it not only joins the leg to the underside of the piece of furniture but also joins the two adjacent pieces of furniture together. The two piece embodiment may also be used without a leg to join adjacent pieces of furniture together.

An object of the present invention is to provide a simple way to connect legs to the underside of modular sectional furniture. A further object of the present invention is to provide a simple way of joining adjacent sections of modular sectional furniture to each other. A further object of the present invention is to provide a member which can be easily operated and installed by the user. A further object of the present invention is provide a furniture leg which can be relatively easily and inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 2 is an exploded perspective view of the first embodiment of the present invention.

FIG. 3 is a top view of the first embodiment of the plate of the present invention.

FIG. 4 is a top view of the first embodiment of the plate and S-shaped member of the present invention.

FIG. 5 is a top view of the second embodiment of the plate of the present invention.

LIST OF REFERENCE NUMERALS

Figure 1:
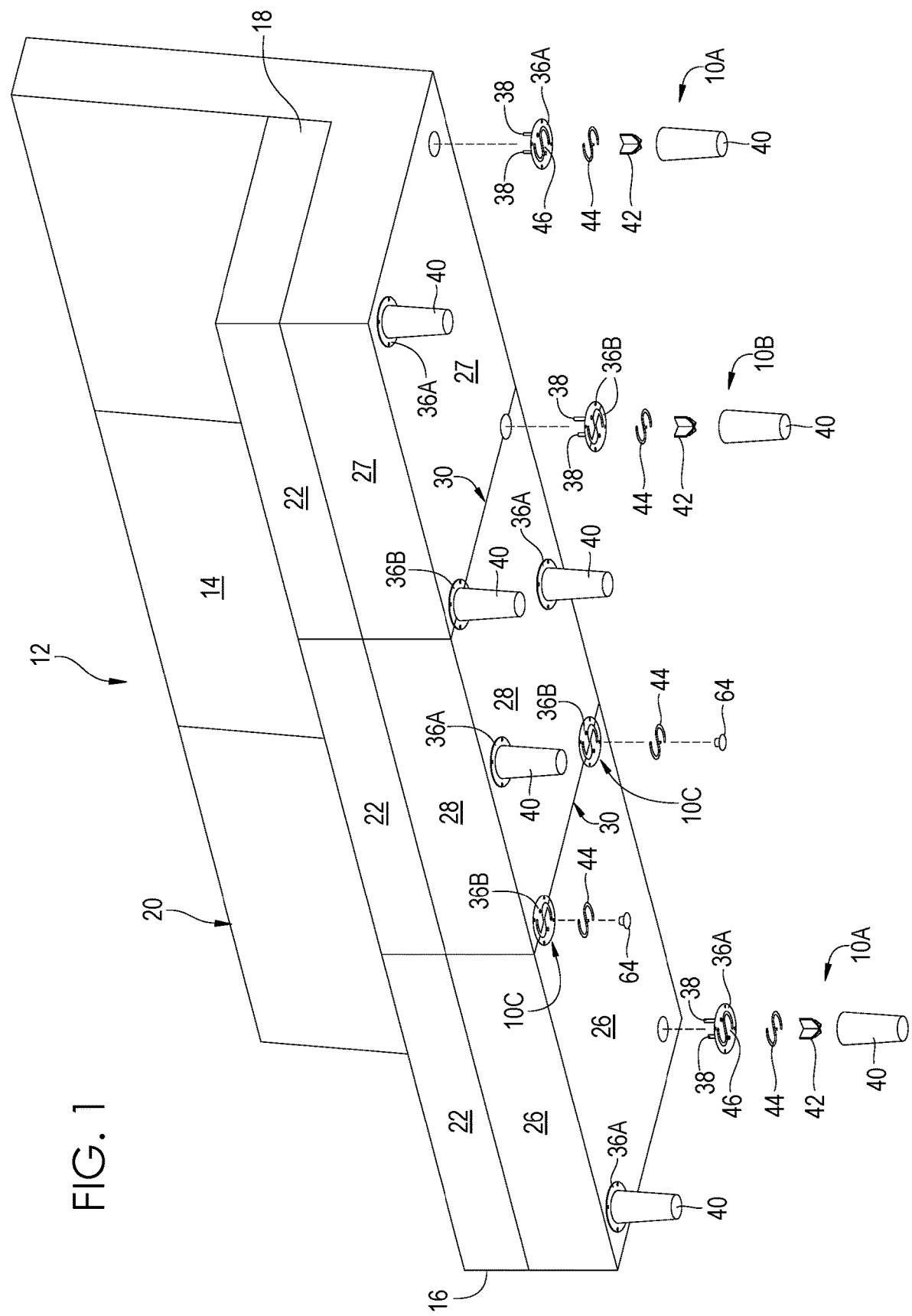
FIG. 1 is a perspective view of the underside of a piece of furniture illustrating the present invention.

With regard to reference numerals used, the following numbering is used throughout the drawings.

10A first embodiment of present invention
10B second embodiment of present invention
10C third embodiment of present invention
12 sofa
14 back portion 16 first end portion
18 second end portion
20 general seating area
22 cushions
24 spacer/attachment member
26 first section
27 third section
28 second section
30 seam/joint
32 first frame member
34 second frame member
36A one piece plate
36B two piece plate
38 studs
40 leg
42 insert
44 S-shaped member
46 S-shaped aperture
48 first S-shaped aperture portion
50 second S-shaped aperture portion
52 screws/fasteners
54 mounting holes
56 inner edge
58 ends
60 aperture for insert
62 supporting surface
64 knob/handgrip
66 top surface
68 bottom surface

DETAILED DESCRIPTION OF THE
PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 7 illustrate the present invention wherein a method and apparatus for attaching legs to modular sectional furniture is disclosed and which is generally indicated by reference number 10, wherein 10A, 10B, and 10C are first, second, and third embodiments.

Turning to FIG. 1, therein is shown an environmental view illustrating the present invention 10A, 10B, 10C installed on an exemplary sofa 12 being conventional in nature having a back portion 14 and first and second end portions 16, 18 and providing a general seating area 20 wherein the seating area is provided with cushions 22 extending across its upper portion for use by a user. The sofa 30 would be comprised of a minimum of a first section 26 and a second section 28 but could have additional sections, e.g., 27 as shown. Abutting seam or joint 30 is formed between the first, second, and third sections 26,27,28 wherein the seam/joint is clearly visible on all edges between the sections 26,27,28 with the present invention 10B, 10C shown disposed along the seam/joint 30.

The present invention has three embodiment 10A, 10B, 10C wherein the embodiment 10A has a plate 36A which is a single piece and embodiment 10B has a plate 36B which has two pieces so that the plate can be placed along on the seam 30 so as to join the two pieces 26,28 together. Embodiment 10C is shown installed on seam 30 and is the same as embodiment 10B except that it has no leg 40 thereon and is used merely to join two adjacent sections of the piece of furniture together. Also shown disposed on an upper side of the plates 36A and 36B are a plurality of upright standing studs 38, which while being shown as two members in FIG. 1 could comprise a different number of studs, e.g., three or four studs. The studs 38 extend into and become attached to the piece of furniture 12. Also shown is the leg 40 which is the same for embodiment 10A and embodiment 10B. The leg 40 receives an insert 42 having attached thereto an S-shaped member 44 which mates with an S-shaped aperture 46 in plate 36A or 36B. In embodiment 10A, plate 36A has a single S-shaped aperture because it is made of one piece, whereas in embodiment 10B, plate 36B has a pair of S-shaped apertures 48, 50 which when the pieces of the plate 36B are placed side by side so that together they form a single S-shaped aperture. Embodiment 10A includes a plate 36A made of one piece which mounts to the bottom side of the piece of furniture 12 using screws 52 (not shown, see FIG. 2) for insertion through the mounting holes 54 so that the studs 38 are inserted into and become disposed on the piece of furniture 12. The S-shaped member 44 then passes through the plate 36A to the upper side of the plate and turns/rotates approximately 45 to 90 degrees so that the inner edges 56 of the ends 58 of the S-shaped member frictionally engages the studs 38 which then locks the leg 40 to the piece of furniture 12. Embodiment 10B works similarly to the embodiment 10A except that the plate 36B is split into two parts for placement on each side 26, 28 of the mating parts of the piece of furniture 12. When the S-shaped member 44 is turned and frictionally engages the studs 38, it not only joins the leg 40 to the underside of the piece of furniture 12, but also joins the two pieces 26, 28 of the furniture 12 together. Embodiment 10C is show disposed on seam 30 and joins sections 26,28 together and includes a knob 64 which is grasped by the hand of a user and used for turning the s-shaped member 44 in either a clockwise or counterclockwise direction, depending on how it is installed, to bring it into locking contact with studs 38. Knob, grip, or handgrip 64 could be replaced by a lever, a handle of a wrench or socket, or other tool useful for turning the s-shaped member, or the like.

Turning to FIG. 2, therein is shown embodiment 10A of the present invention wherein the plate 36A is shown having studs 38 on an upper side along with screws or fasteners 52 and mounting holes 54. The S-shaped member 44 is shown along with the inner edge surfaces 56 and ends 58. Also shown is the insert 42 joined to S-shaped member 44 using spacer/attachment member 24 for attachment to the leg 40 by placement in a aperture 60 complementary sized and shaped and formed in an upper end of the leg 40, which then causes a lower end of the leg to rest on a supporting surface 62 (see FIGS. 6-7) in the conventional manner. S-shaped aperture 46 is also shown. The purpose of spacer 24 is to allow the s-shaped member 44 to pass completely through the s-shaped aperture and to make contact with the studs 38 and therefore the length of the spacer 24 is slightly more than the thickness of plate 36A.

Turning to FIGS. 3-4, therein is shown a top view of a one piece plate 36A showing the S-shaped aperture 46 along with the mounting holes 54 and studs 38. FIG. 4 is the same as FIG. 3 but shows the S-shaped member 44 (shown with stippling) having been passed upwardly through the S-shaped aperture 46 and turned so as to be in a locking position with studs 38 thereby illustrating how the S-shaped member 44 cooperates with the studs 38.

Turning to FIG. 5, therein is shown a two piece mounting plate 36B showing first S-shaped aperture 48 along with a second S-shaped aperture 50 including its mounting holes 54 which allows embodiment 10B to be mounted on seam 30 as previously disclosed. The two piece mounting plate 36B is from a cut-through made through the center of the plate from the top to the bottom of the S which forms two one-half pie shaped pieces. When the two pieces 36B are installed on adjacent sections of furniture as illustrated in FIG. 1, the two pieces are then placed contiguously to each other so that they function substantially the same as the one piece plate 36A.

Figure 6:
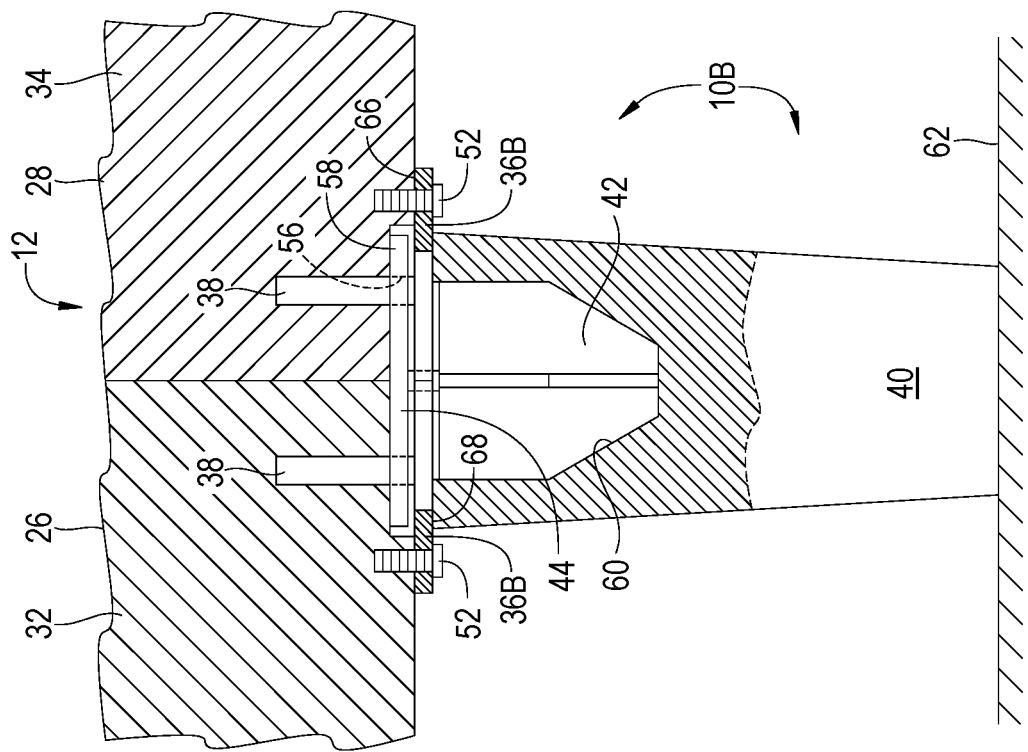
FIG. 6 is a side sectional view of one embodiment of the present invention shown in operative connection with a piece of furniture.

Turning to FIG. 6, therein is shown the present invention 10A wherein the studs 38 are mounted into a frame member 32 of a piece of modular furniture 12. Also shown is the leg 40 having an insert 42 therein along with the one piece mounting plate 36A attached to the underside of the piece of furniture 12 using screws 52 and having the S-shaped member 44 pass through the S-shaped aperture (not visible) so that the inner edges 56 of the ends 58 of the S-shaped member 44 contact and are frictionally joined to the studs 38. Supporting surface 62 is also shown.

Figure 7:
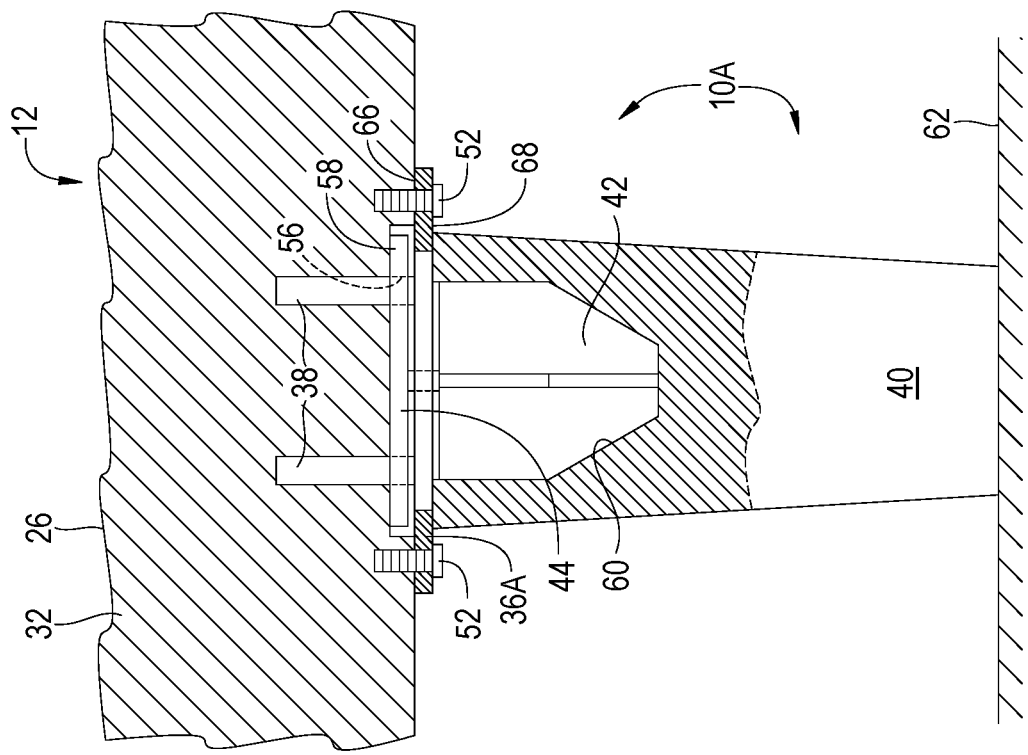
FIG. 7 is a side sectional view of a second embodiment of the present invention shown in operative connection with a piece of furniture.

Turning to FIG. 7, therein is shown the present invention 10B wherein the studs 38 are mounted into a frame member 32, 34 of a piece of modular furniture 12. Also shown is the leg 40 having an insert 42 therein along with the two piece mounting plate 368 attached to frame 32, 34 of adjacent sections 26, 28 of the underside of the piece of furniture 12 using screws 52 and having the S-shaped member 44 pass through the S-shaped aperture (not visible) so that the inner edges 56 of the ends 58 of the S-shaped member 44 contact the studs 38. Supporting surface 62 is also shown.

By way of summary and by making reference to FIGS. 1-7, the present invention 10 provides a method for attaching a leg 40 to a piece of modular furniture 12, including providing a plate 36A, 36B having a top 66 surface and a bottom 68 surface and a S-shaped aperture 46 therein and a plurality of mounting holes 54 therein, attaching the plate to an underside of the piece of modular furniture by passing the plurality of fasteners 52 through the plurality of mounting holes for so that the top surface of the plate contacts the underside of the piece of modular furniture; providing a first and a second stud 38 on the top surface of the plate so that the first and second studs extend into the piece of modular furniture; providing a leg 40 having a top end and a lower end, wherein the lower end of the leg rests on a supporting surface 62; passing an S-shaped member 44 entirely through the S-shaped aperture, the S-shaped member having a first and second end 58, the S-shaped member having a first and second inner surface 56 proximate the first and second end, and spacing with 24 the S-shaped member away from the top end of the leg so that the S-shaped member passes through the S-shaped aperture and then rotates so that the first and second inner surfaces of the S-shaped member frictionally engages the first and second studs. Furthermore, wherein the plate is a one-piece construction 36A or a two-piece construction 36B for joining adjacent sections 26, 27, 28 of the modular furniture together and wherein the plate has a first piece and a second piece, wherein the first piece is attached to a first section of the modular furniture and the second piece is attached to a second section of the modular furniture and further comprising the step of substituting a handgrip or grip 64 for the leg and turning the grip or handgrip so that the handgrip is used to make the S-shaped member turn, and further comprising the step of providing an insert 42, wherein the insert is inserted into the top end of the leg for receiving the spacer 24 so that the S-shaped member passes through the S-shaped aperture, and wherein the spacer is longer than the plate is thick.

I claim:

1. An apparatus for attaching a leg to a piece of modular furniture, comprising:
   (a) a plate having a top surface and a bottom surface, wherein said plate has an S-shaped aperture therein and a plurality of mounting holes therein, wherein a plurality of fasteners pass through said plurality of mounting holes for attaching said plate to an underside of the piece of modular furniture so that said top surface of said plate contacts said underside of said piece of modular furniture;
   (b) a first and a second stud disposed on said top surface, wherein said first and second studs extend into said piece of modular furniture;
   (c) a leg having a top end and a lower end, wherein said lower end of said leg rests on a supporting surface;
   (d) an S-shaped member complementarily sized and shaped as said S-shaped aperture so that said S-shaped member passes entirely through said S-shaped aperture, said S-shaped member having a first and second end, said S-shaped member having a first and second inner surface proximate said first and second end, and
   (e) a spacer for joining said top end of said leg to a bottom surface of said S-shaped member so that said S-shaped member passes through said S-shaped aperture and then rotates so that said first and second inner surfaces of said S-shaped member frictionally engages said first and second studs.

2. The apparatus of claim 1, wherein said plate is a one-piece construction.

3. The apparatus of claim 1, wherein said plate is a two-piece construction for joining adjacent sections of said modular furniture together.

4. The apparatus of claim 3, wherein said plate has a first piece and a second piece, wherein said first piece is attached to a first section of the modular furniture and said second piece is attached to a second section of said modular furniture.

5. The apparatus of claim 1, further comprising a handgrip, wherein said handgrip is substituted for said leg so that said handgrip is used to turn said S-shaped member.

6. The apparatus of claim 1, further comprising an insert, wherein said insert is inserted into said top end of said leg for receiving said spacer so that said S-shaped member passes through said S-shaped aperture.

7. The apparatus of claim 1, wherein said spacer is longer than said plate is thick.

8. A method for attaching a leg to a piece of modular furniture, comprising the steps of:
   (a) providing a plate having a top surface and a bottom surface and a S-shaped aperture therein and a plurality of mounting holes therein, attaching the plate to an underside of the piece of modular furniture so that the top surface of the plate contacts the underside of the piece of modular furniture;
   (b) providing a first and a second stud on the top surface of the plate so that the first and second studs extend into the piece of modular furniture;
   (c) providing a leg having a top end and a lower end, wherein the lower end of the leg rests on a supporting surface;
   (d) passing an S-shaped member entirely through the S-shaped aperture, the S-shaped member having a first and second end, the S-shaped member having a first and second inner surface proximate the first and second end, and (e) spacing the S-shaped member away from the top end of the leg so that the S-shaped member passes through the S-shaped aperture and then rotates so that the first and second inner surfaces of the S-shaped member frictionally engages the first and second studs.

9. The method of claim 8, wherein the plate is a one-piece construction.

10. The method of claim 8, wherein the plate is a two-piece construction for joining adjacent sections of the modular furniture together.

11. The method of claim 10, wherein the plate has a first piece and a second piece, wherein the first piece is attached to a first section of the modular furniture and the second piece is attached to a second section of the modular furniture.

12. The method of claim 8, further comprising the step of turning a grip so that the S-shaped member turns.

13. The method of claim 8, further comprising the step of providing an insert, wherein the insert is inserted into the top end of the leg for receiving the spacer so that the S-shaped member passes through the S-shaped aperture.

14. The method of claim 8, wherein the spacer is longer than the plate is thick.

15. The method of claim 8, further comprising the step of providing a plurality of fasteners to attach the plate to the underside of the piece of modular furniture so that the top surface of the plate contacts the underside of the piece of modular furniture.

\* \* \* \* \*